United States Patent
Lupu et al.

(10) Patent No.: US 9,003,363 B2
(45) Date of Patent: Apr. 7, 2015

(54) DEVICE FLAGS

(75) Inventors: Corneliu I. Lupu, Sammamish, WA (US); Silviu C. Calinoiu, Redmond, WA (US); Cristian G. Petruta, Redmond, WA (US); Batsaihan Jargalsaihan, Bellevue, WA (US); Chris Ernest Matichuk, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 265 days.

(21) Appl. No.: 13/052,757

(22) Filed: Mar. 21, 2011

(65) Prior Publication Data

US 2012/0246632 A1    Sep. 27, 2012

(51) Int. Cl.
G06F 9/44 (2006.01)
G08B 23/00 (2006.01)
G06F 15/00 (2006.01)

(52) U.S. Cl.
CPC .................................. *G06F 9/4413* (2013.01)

(58) Field of Classification Search
None
See application file for complete search history.

(56) References Cited

U.S. PATENT DOCUMENTS

| | | | |
|---|---|---|---|
| 5,390,301 A | 2/1995 | Scherf | |
| 5,745,763 A | 4/1998 | Mealey et al. | |
| 6,158,011 A | 12/2000 | Chen et al. | |
| 6,363,409 B1 | 3/2002 | Hart et al. | |
| 6,385,663 B2 | 5/2002 | Senator | |
| 6,591,417 B1 | 7/2003 | Strysniewicz et al. | |
| 6,745,385 B1 | 6/2004 | Lupu et al. | |
| 7,334,227 B2 | 2/2008 | Kim et al. | |
| 7,392,527 B2 | 6/2008 | Callender | |
| 7,478,381 B2 * | 1/2009 | Roberts et al. | 717/168 |
| 7,870,565 B2 * | 1/2011 | Durham et al. | 719/318 |
| 7,996,814 B1 * | 8/2011 | Qureshi et al. | 717/120 |
| 2002/0174264 A1 | 11/2002 | Fuller et al. | |
| 2004/0215754 A1 | 10/2004 | Orleth et al. | |
| 2005/0108369 A1 | 5/2005 | Sather et al. | |
| 2005/0149947 A1 | 7/2005 | Callender | |
| 2005/0210463 A1 | 9/2005 | Abe | |
| 2006/0149845 A1 | 7/2006 | Malin et al. | |
| 2007/0101342 A1 | 5/2007 | Flegg et al. | |
| 2007/0201059 A1 * | 8/2007 | Radzykewycz et al. | 358/1.9 |
| 2007/0209032 A1 * | 9/2007 | Mihai et al. | 717/126 |
| 2010/0082714 A1 | 4/2010 | Herron et al. | |
| 2011/0067038 A1 | 3/2011 | Troccoli et al. | |
| 2012/0198514 A1 | 8/2012 | McCune et al. | |
| 2012/0227057 A1 * | 9/2012 | Lupu et al. | 719/318 |

(Continued)

OTHER PUBLICATIONS

"International Search Report", Mailed Date: Oct. 31, 2012, Application No. PCT/US2012/028667, Filed Date: Mar. 11, 2012, pp. 8.

(Continued)

*Primary Examiner* — Don Wong
*Assistant Examiner* — Mohammad Kabir
(74) *Attorney, Agent, or Firm* — John Jardine; Kate Drakos; Micky Minhas (57) ABSTRACT

Device flag techniques are described. In one or more implementations, responsive to detection by a computing device that a device has been communicatively coupled to bus of the computing device, a database is queried by the computing device to determine whether one or more flags have been set for the device. Responsive to a determination made as a result of the querying that the one or more flags have been set for the device identifier, information associated with the one or more flags is communicated to software that is associated with the device to configure the software.

20 Claims, 5 Drawing Sheets

(56) References Cited

U.S. PATENT DOCUMENTS

2012/0239800 A1* 9/2012 Matichuk .................... 709/224
2012/0256760 A1* 10/2012 Johnson et al. .......... 340/870.02

OTHER PUBLICATIONS

Russell, Rusty., "Virtio: Towards a De-Facto Standard for Virtual I/O Devices", Retrieved at << http://ozlabs.org/~rusty/virtio-spec/virtio-paper.pdf >>, ACM SIGOPS Operating Systems Review—Research and developments in the Linux kernel, vol. 42, No. 5, Jul. 2008, pp. 9.

"Windows Filtering Platform", Retrieved at << http://www.worldlingo.com/ma/enwiki/en/Windows_Filtering_Platform >>, Retrieved Date: Dec. 30, 2010, pp. 3.

"SP_DEVINSTALL_PARAMS Structure", Retrieved at << http://msdn.microsoft.com/en-us/library/ff552346.aspx >>, Retrieved Date: Dec. 30, 2010, pp. 8.

"Final Office Action", U.S. Appl. No. 13/040,847, (May 30, 2013), 17 pages.

"Non-Final Office Action", U.S. Appl. No. 13/040,847, (Nov. 23, 2012), 15 pages.

"Non-Final Office Action", U.S. Appl. No. 13/040,847, Jan. 29, 2014, 18 pages.

"Final Office Action", U.S. Appl. No. 13/040,847, Jun. 6, 2014, 19 pages.

"Non-Final Office Action", U.S. Appl. No. 13/040,847, Nov. 17, 2014, 20 pages.

"Extended European Search Report", EP Application No. 12760583.0, Sep. 5, 2014, 7 pages.

* cited by examiner

402
Responsive to detection by a computing device that a device has been communicatively coupled to bus of the computing device, query a database by the computing device to determine whether one or more flags have been set for the device

404
Responsive to a determination made as a result of the querying that the one or more flags have been set for the device identifier, communicate information associated with the one or more flags to a driver that is associated with the device to configure the driver

502
Receive telemetry data via a network at one or more computing devices of a network service, the telemetry data identifying firmware of devices, corresponding drivers via which the devices communicate, and configuration of the drivers 504
Process the telemetry data at one or more computing device to determine which of the devices described in the telemetry data include firmware that involves an update to enable operation of functionality of the device in conjunction with a respective computing device that otherwise would not be enabled

Fig. 5

DEVICE FLAGS

BACKGROUND

Computing devices may include a variety of different hardware devices to expand the functionality available to the computing device. For example, the hardware devices may include internal devices that may be configured within a housing of the computing devices as well as external devices, such as printers, cameras, and so on. Drivers are typically employed to enable communication between an operating system of the computing device and the devices.

The continuing development of software executed on the computing device, however, may cause changes in how the software interacts with the drivers. Consequently, a driver that is compatible with a previous version of an operating system, for example, may not be compatible with later versions of the operating system. Traditional techniques that were used to combat this incompatibility included writing a newer version of the driver. Although this may restore functionality of the device, the writing of the driver may involve a wait until the driver is available for dissemination, involve a user locating the newer version of the driver, and so on that could lead to user frustration and lost productivity.

SUMMARY

Device flag techniques are described. In one or more implementations, responsive to detection by a computing device that a device has been communicatively coupled to bus of the computing device, a database is queried by the computing device to determine whether one or more flags have been set for the device. Responsive to a determination made as a result of the querying that the one or more flags have been set for the device identifier, information associated with the one or more flags is communicated to software that is associated with the device to configure the software.

In one or more implementations, a computing device detects that a device has been communicatively connected to a bus of the computing device and a device identifier of the device is obtained by a bus driver that is executed on the computing device and manages the bus. The device identifier of the device is communicated by the bus driver to an engine that is executable on the computing device. A database is queried by the engine to determine whether one or more flags have been set for the device identifier and responsive to a determination that the one or more flags have been set for the device identifier, information is communicated that relates to the one or more flags to the bus driver and the information is applied by the bus driver.

In one or more implementations, usage telemetry data is received via a network at one or more computing devices of a network service, the usage telemetry data identifying firmware of devices, corresponding drivers via which the devices communicate, and configuration of the drivers. The usage telemetry data is processed at one or more computing devices to determine which of the devices described in the usage telemetry data include firmware that involves an update to enable operation of functionality of the device in conjunction with a respective computing device that otherwise would not be enabled.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Computing devices may include (e.g., be communicatively coupled to) a wide variety of different devices such that functionality of the device may be utilized by the computing device. For example, a computing device may be communicatively coupled to a printer, optical disc reader/writer, thumb drive, or other peripheral device that may be internal (e.g., within a housing) or external to the computing device. A driver may be utilized to enable communication between the computing device and the device, such as to translate commands and data from an operating system of the computing device into a form that is understandable by the device and vice versa. However, changes to the operating system may cause incompatibilities with the driver and consequently with the device.

Device flag techniques are described which may be leveraged to maintain compatibility, such as between software of the computing device (e.g., an operating system) and a device and driver of the device. This compatibility may be provided in a variety of ways. For example, a flag engine (e.g., which may be implemented as part of a shim engine) may maintain a database of hardware IDs and corresponding flags. Therefore, when a device is detected as being connected to the computing device (e.g., by a bus driver), the flag engine may be queried to determine if there are any flags set for the device ID. Information relating to this flag may then be communicated to the driver to configure the driver accordingly, such as for code path selection, enable device specific capabilities, and so on, further discussion of which may be found in relation to the following sections.

In the following discussion, an example environment is first described that may be leveraged according to driver shimming techniques. Example procedures are then described which may also be employed in the example environment as well as other environments. Accordingly, performance of the example procedures is not limited to the example environment and the example environment is not limited to performing the example procedures.

Example Environment

Figure 1:
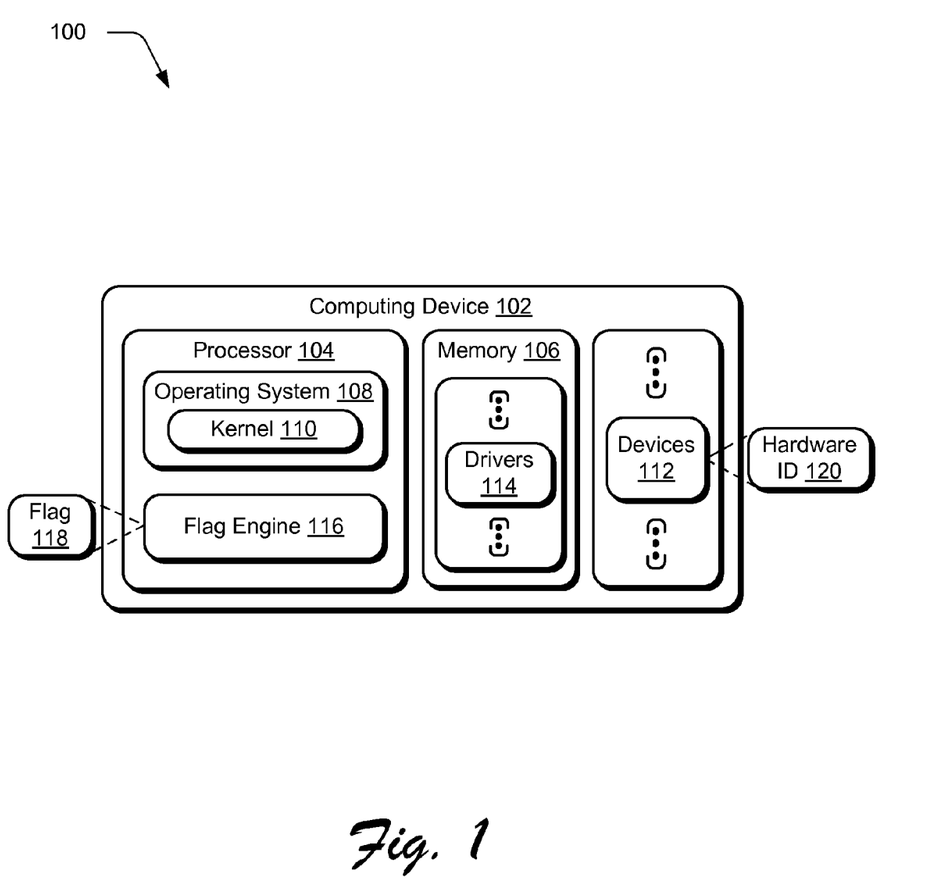
FIG. 1 is an illustration of an environment in an example implementation that is operable to perform device flag techniques.

FIG. 1 is an illustration of an environment 100 in an example implementation that is operable to employ techniques described herein. The illustrated environment 100 includes a computing device 102, which may be configured in a variety of ways. For example, the computing device 102 may be configured as portable game device, mobile phone, a computer that is capable of communicating over a network (e.g., a desktop computer, one or more servers, an entertainment appliance), a set-top box communicatively coupled to a display device, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations, a remote control and set-top box combination, and so on.

The computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

The computing device 102 is also illustrated as including a processor 104 and memory 106. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single processor 104 and memory 106 are shown, a wide variety of types and combinations of memory and/or processors may be employed.

The computing device 102 is illustrated as also includes an operating system 108 having a kernel 110 and one or more drivers 112 that are configured to support communication between the kernel 110 of the operating system 108 and one or more devices 114. The kernel 110 represents a component of the operating system 108 that is typically employed to abstract functionality of underlying devices such as the processor 108, memory 106, and other devices 112 to applications and other software that are executed by the computing device 102. Although the operating system 108 and kernel 110 are illustrated as being executed on the processor 104, these modules are also storable in memory 106.

The devices 112 may be representative of a variety of different devices that may be employed by the computing device 102. For example, the devices 112 may include peripheral devices, such as printers, scanners, hard drives, and so on. The devices 112 may also represent functionality of other computing devices that may be leveraged by the computing device 102, such as to use a mobile phone as a storage device, access photos on the mobile phone, and so on. Thus, the computing device 102 may leverage a variety of different devices 112 to add to the functionality of the computing device 102.

In order for the devices 112 to communicate with the computing device 102, and more particularly the operating system 108 and kernel 110 of the computing device, one or more drivers 114 may be employed. Drivers 114 are typically employed to abstract functionality of a corresponding device 112. For example, the driver 114 may be configured as a series of layers to translate commands from the kernel 110 of the operating system 108 into device specific commands that are "understandable" by a respective device.

A variety of different drivers 114 may be employed by the computing device 102. For example, the driver 114 may be configured as a class driver that is configured to interact with a number of different types of a device 112. For example, a class driver may be configured for use with optical reader/writer, storage devices, networking, and so on. Another example involves a bus driver, such as a driver employed by a USB, PCI, or similar bus such that devices that share a common protocol (e.g., the USB protocol) may leverage the same driver to be compatible with the computing device 102. Other different types of drivers from a device stack (e.g., bus driver, class driver, filter driver, device driver) may employ these techniques. Further, a variety of other software may also leverage these techniques, such as application to make contextual based code path selection based on flags and corresponding retrieval of data based on a device identifier.

As previously described, however, there may be some instances in which the driver 114 is not longer compatible with software of the computing devices, such as the kernel 110 of the operating system 108. For example, the operating system 108 may be updated to a newer version, have a service pack applied, and so on that may change how the operating system 108 is configured to communicate with the driver 114.

Accordingly, the computing device 102 may employ a flag engine 116 that is representative of functionality to employ one or more flags 118 to support compatibility of the drivers 114 with the operating system 108. For instance, the flag engine 116 may receive a hardware ID 120 of a device 112 when the device is communicatively coupled to the computing device 102, e.g., to a bus. The hardware ID 120 may then be used by the flag engine 116 to determine whether one or more flags 118 correspond to the hardware ID 120. Information relating to the flag 118 may then be leveraged by the driver 114 to support communication with the device 112. In this way, behavior of particular devices may be flagged and used as a basis to determine a "fix" to communicate with the device 114. This may be used to support a wide variety of functionality, an example of which is that the computing device 102 may employ a generic driver 114 that may be specifically configured for particular devices 112, further discussion of which may be found in relation to FIG. 2.

Generally, any of the functions described herein can be implemented using software, firmware, hardware (e.g., fixed logic circuitry), manual processing, or a combination of these implementations. The terms "module," "engine," and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

Figure 2:
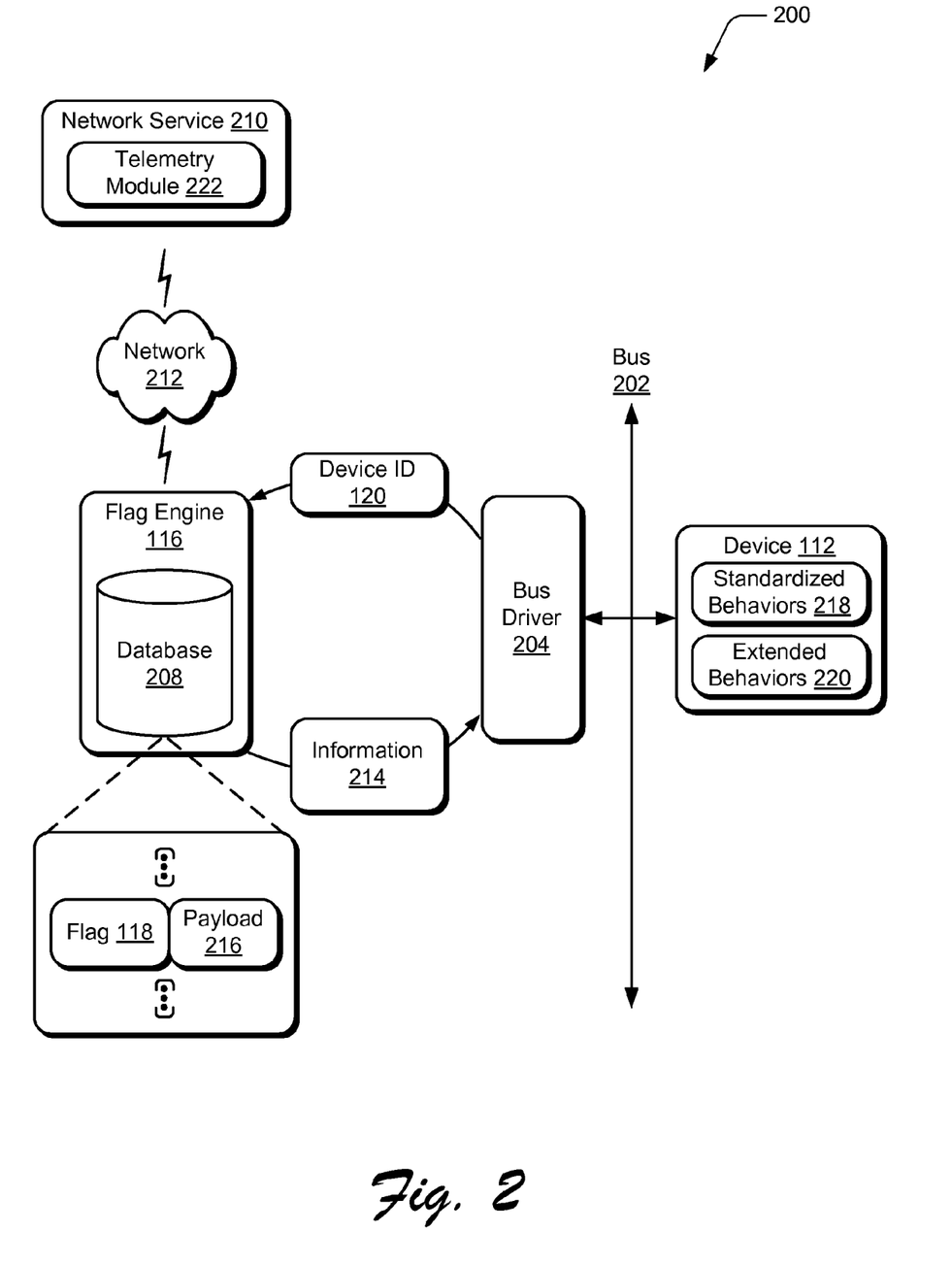
FIG. 2 is an illustration of a system in an example implementation showing interaction between a device, driver, and flag engine of FIG. 1.

FIG. 2 illustrates an example implementation 200 of communication of components of the computing device 102 of FIG. 1 to employ flag techniques for driver compatibility. In this example, a device 112 is initiates a communicative connection with a bus 202 of the computing device 102 of FIG. 1. A bus driver 204 may detect this connection and provide a device ID 120 that identifies the device 112. For example, the device ID 120 may identify particular hardware, firmware, and so on of the device 112. The device ID 120 may also be based on functionality supported by the device 112.

The flag engine 116 may then receive this device ID 120 and determine whether one or more behaviors of the device 112 have been flagged by examining a database 208. The flag engine 116, for instance, may determine whether a flag 118 corresponds to the device ID 120. In the illustrated example the database 208 is illustrated as being local to the computing device 102 but other instances are also contemplated, such as available at a network service 210 accessible via a network 212.

If the device ID 120 has a corresponding flag 118 in the database 208, the flag engine 116 may provide corresponding information 214 back to the bus driver 204. For example, the information 214 may describe the flag itself, such as that "bit 5 is set" meaning that a particular power command is not to be given to the device 112 by the bus driver 204. In another example, the flag 118 may be associated with a payload 216 that contains more detailed information that may be used to configure the bus driver 204.

The device 112, for instance, may be configured in accordance with a standard and therefore include standardized behaviors 218, i.e., behaviors that are consistent with the standard. The device 112 may also include extended behaviors 220 that are not included in the standard, such as additional features that may be added to future standards and/or help the device 112 to differentiate itself in the marketplace. By using the techniques described herein, however, these extended behaviors 220 may be supported by the bus driver 204 through use of the flags 118 and/or payloads 216 to configure the bus driver 204 for the extended behaviors 220. This configuration may be supported in a variety of ways, such as to use the flag 118 for code path selection by the bus driver 204, such the payload 216 for device specific capabilities, and so on.

The flag engine 116 may also provide telemetry data to the network service 210, which may be leveraged for a variety of different features. As illustrated in FIG. 2, for instance, the network service 210 is illustrated as including a telemetry module 222 that is representative of functionality to process telemetry data received from the flag engine 116. For example, the telemetry module 222 may be leveraged such that developers of software or devices 112 could indicate whether functionality of a previous versions of software (e.g., the operating system 108) are to be employed to communicate with the device 112 and indicate this using a flag 118.

The telemetry data, for instance, may include details such as the device ID 120 and a context for events that occur in relation to the bus driver 204 and device 112. This usage data may then be used to address these events, such as to determine compatibility test requirements for introducing an update, identify particular devices in a market that are to involve an update, determine whether devices have adapted to a later version and thus a flag is no longer relevant (e.g., firmware of the device 112 has been updated to address an updated version of an operating system 108), and so on. Further discussion of these and other techniques may be found in relation to the following procedures.

Example Procedures

The following discussion describes shared resource access verification techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
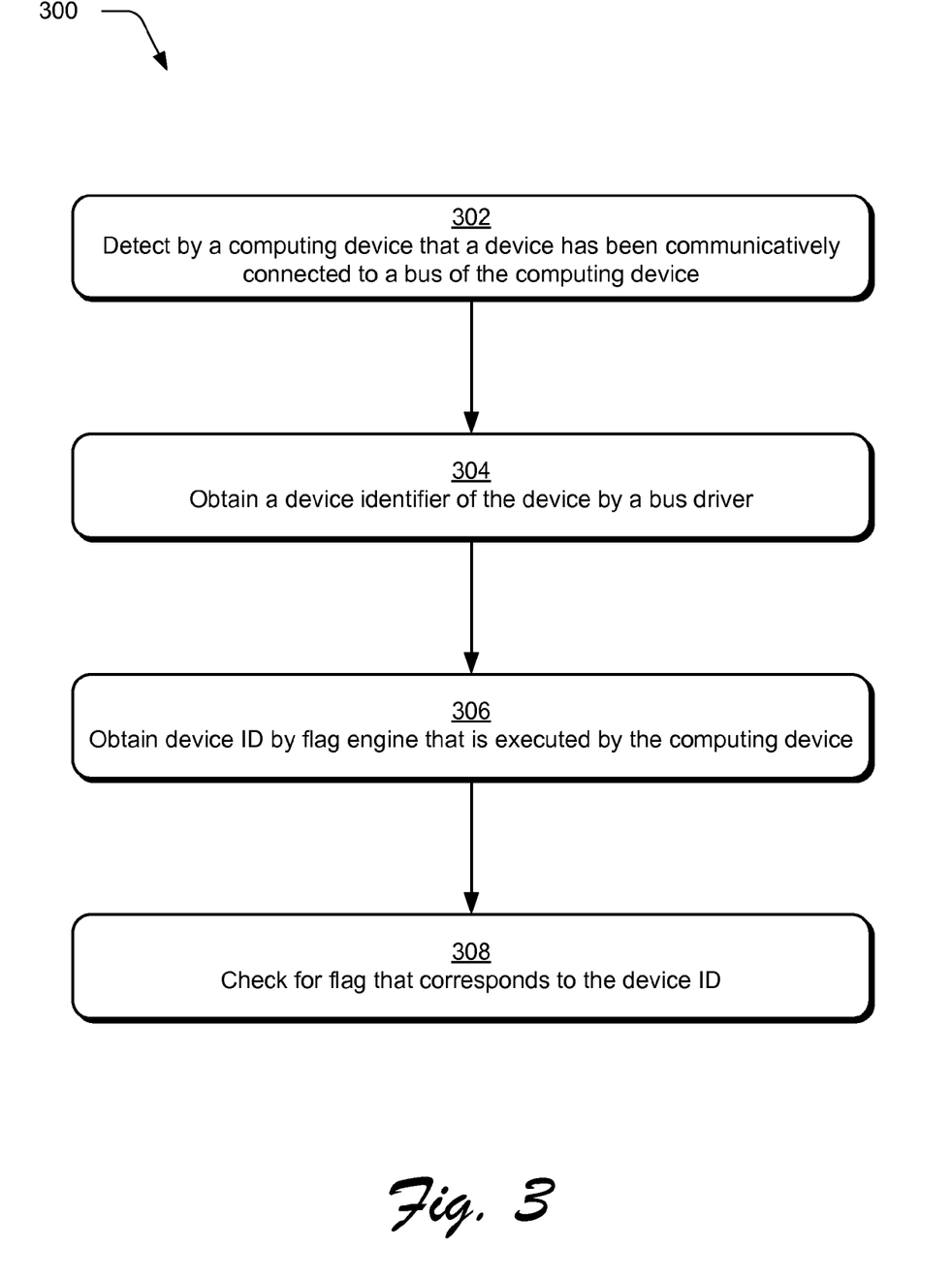
FIG. 3 is a flow diagram depicting a procedure in an example implementation in which connection of a device to a computing device is detected and initiates a process to check as to whether a flag is set for the device.

FIG. 3 depicts a procedure 300 in an example implementation in which connection of a device to a computing device is detected and initiates a process to check as to whether a flag is set for the device. A computing device detects that a device has been communicatively connected to a bus of the computing device (block 302). A bus driver, for instance, may execute on the computing device 102 and detect that a device 114 has been connected to the bus 202 during runtime. In another instance, a class driver may be initiated that corresponds to the device 114 being connected, such as a network call driver for a network device, storage class driver for a storage device, applications may be specifically configured (e.g., and therefore include driver-like functionality), and so on.

A device identifier of the device is obtained by the bus driver (block 304). The device identifier 120, for instance, may describe hardware and/or firmware employed by the device, specific functions supported by the device, be configured as a unique identifier for a particular device (e.g., a serial number), and so on. The device ID is then obtained by a flag engine that is executed by the computing device (block 306) and a check is performed to determine whether a flag correspond to the device ID (block 308), further discussion of which may be found in relation to the following figure.

Figure 4:
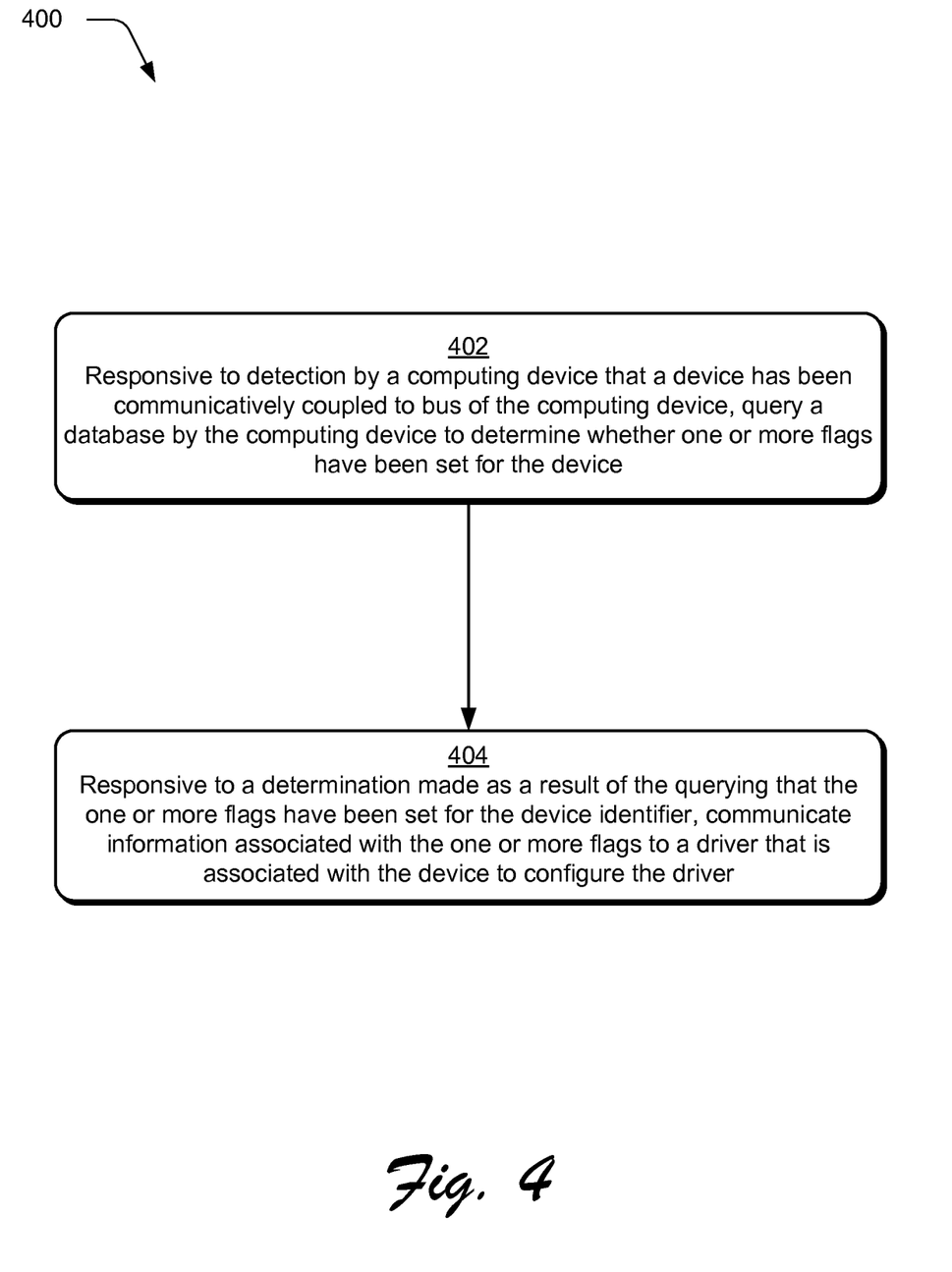
FIG. 4 is a flow diagram depicting a procedure in an example implementation in which a query is performed to determine whether a flag has been set for a particular device.

FIG. 4 depicts a procedure 400 in an example implementation in which a query is performed to determine whether a flag has been set for a particular device. Responsive to detection by a computing device that a device has been communicatively coupled to bus of the computing device, a database is queried by the computing device to determine whether one or more flags have been set for the device (block 402). The flag engine 116, for instance, may receive the request from the driver 114 and query the database 208.

Responsive to a determination made as a result of the querying that the one or more flags have been set for the device identifier, communicate information associated with the one or more flags to software that is associated with the device to configure the software (block 404). As stated before, the information 214 may be configured in a variety of ways.

For example, the information 214 may describes flags 118 that may be used for code path selection by the driver 114, may include a payload 216 associated with the flag that may be used as a basis for configuring device specific behaviors such as extended behaviors 220 that go beyond a standard, and so on.

Figure 5:
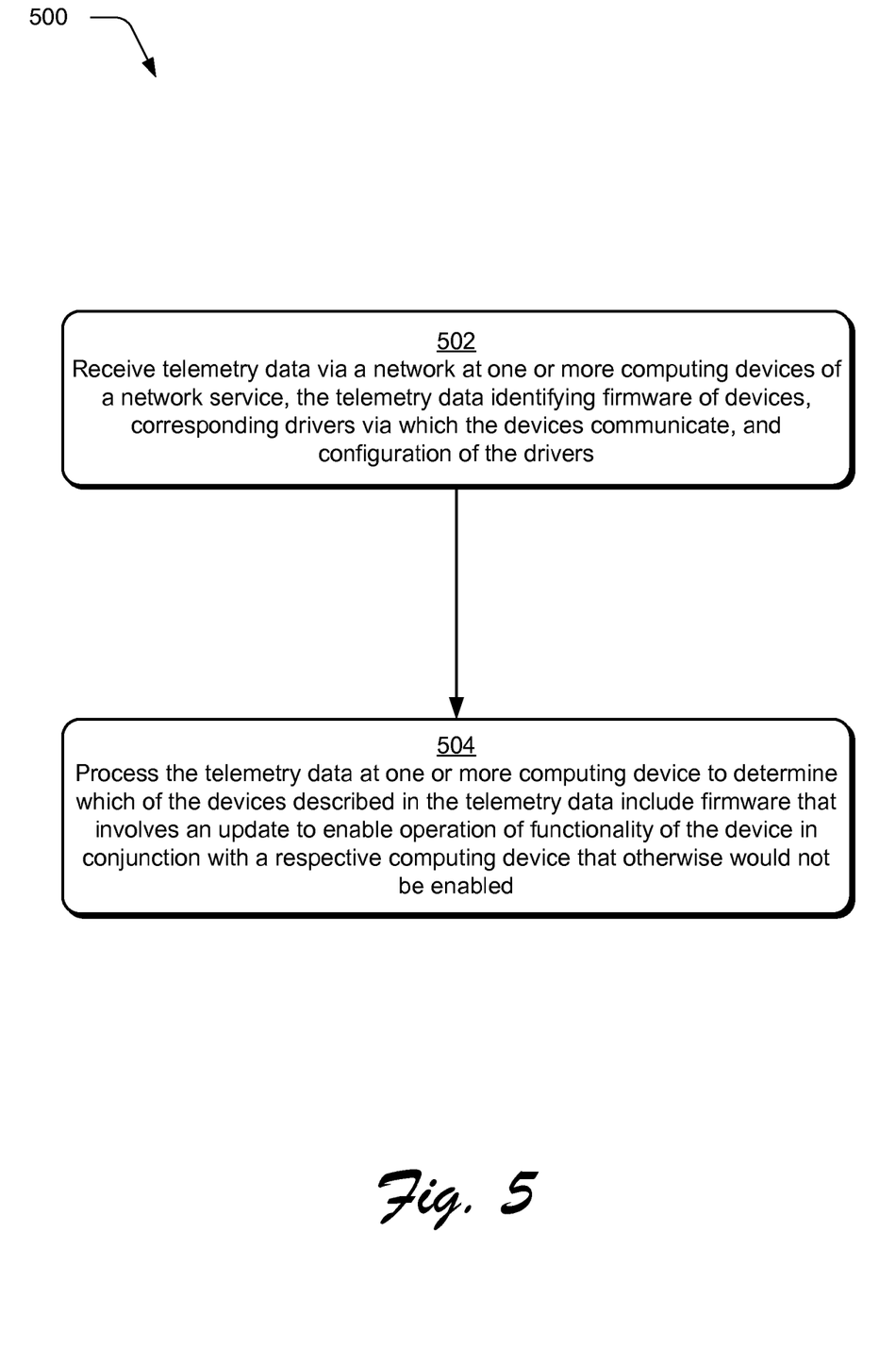
FIG. 5 is a flow diagram depicting a procedure in an example implementation in which telemetry data generated as a result of configuration of a driver by one or more flags is leveraged.

FIG. 5 depicts a procedure 500 in an example implementation in which telemetry data generated as a result of configuration of a driver by one or more flags is leveraged. Telemetry data is received via a network at one or more computing devices of a network service, the telemetry data identifying firmware of devices, corresponding drivers via which the devices communicate, and configuration of the drivers (block 502). The flag engine 116, for instance, may store the telemetry data in the database 208 that describes flags 118, corresponding information 214, drivers 114, and devices 112 (e.g., device IDs 12) that were involved in configuring a driver 114 for compatibility with the device 112. This data may then be transmitted at predefined points in time, responsive to when the described operations were performed, and so on to a network service 210 via a network 212.

The telemetry data is processed at one or more computing device to determine which of the devices described in the telemetry data include firmware that involves an update to enable operation of functionality of the device in conjunction with a respective computing device that otherwise would not be enabled (block 504). Continuing with the previous example, a telemetry module 222 may be employed by the network service 210 to process the telemetry data, which may be used for a variety of purposes. For example, the telemetry data for the device 112 may provide details on which devices 112 (e.g., and corresponding firmware) continue to involve use of flags 118 to provide compatibility, which devices 112 utilize flags 118 to enable device specific capabilities (e.g., extended behaviors 220), which devices have upgraded firmware that no longer requires the use of flags 118, and so on. Developers may then use this information to determine compatibility test requirements when introducing updates to software (e.g., to a new version of an operating system or service pack update) to ensure device compatibility does not regress for devices that depend on the flags 118 to enable device specific capabilities. A variety of other examples are also contemplated without departing from the spirit and scope thereof

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    responsive to detection by a computing device that a device has been communicatively coupled to a bus of the computing device, querying a database by the computing device to determine whether one or more flags, that are maintained in the database, have been set for the device; and
    responsive to a determination made as a result of the querying that the one or more flags have been set for the device, communicating information associated with the one or more flags to software that is associated with the device to configure the software.

2. A method as described in claim 1, wherein the information is configured for use in code path selection of the software.

3. A method as described in claim 1, wherein the information is to configure the software for device specific capabilities of the device.

4. A method as described in claim 1, wherein the software is an application.

5. A method as described in claim 1, wherein the software is a bus driver, class driver, or filter driver.

6. A method as described in claim 1, wherein the software is configured to handle capabilities of the device in accordance with a standard and the information is to configure the software for capabilities of the device that do not involve the standard.

7. A method as described in claim 1, wherein the software is configured to handle capabilities of the device in accordance with a particular version of an operating system and the information is to configure the software for a previous version of the operating system.

8. A method as described in claim 1, further comprising communicating telemetry data via a network to a network service that describes usage of the information by the software.

9. A method as described in claim 8, wherein the telemetry data is usable to determine compatibility test requirements for introducing an update.

10. A method as described in claim 8, wherein the telemetry data is usable to identify particular said devices in a market that are to involve a firmware update to enable functionality of the device that otherwise would not be enabled.

11. A method as described in claim 8, wherein the telemetry data is usable to identify particular said devices in a market that have updated firmware and thus no longer involve usage of the one or more flags.

12. A method comprising:
    receiving telemetry data via a network at one or more computing devices of a network service, the telemetry data enabling the one or more computing devices to identify firmware configurations employed by devices, corresponding drivers via which the devices communicate, and configuration of the drivers; and
    processing the telemetry data at the one or more computing devices to determine which of the devices described in the telemetry data include firmware that involves an update to enable operation of functionality of the device in conjunction with a respective computing device that otherwise would not be enabled.

13. A method as described in claim 12, wherein the telemetry data is transmitted by respective computing devices responsive to the configuration of the drivers using information that correspond to one or more flags located through execution of an engine by the respective computing devices, the one or more flags usable for code path selection of the driver or to enable device specific capabilities.

14. A method as described in claim 12, wherein the drivers are bus drivers, filter drivers, class drivers, or part of an application.

15. A method as described in claim 12, wherein the processing further includes determining compatibility tests to be applied for a subsequent version of an operating system that is to be executed by the computing device.

16. A method comprising:
    detecting by a computing device that a device has been communicatively connected to a bus of the computing device;

obtaining a device identifier of the device by a bus driver that is executed on the computing device and manages the bus;

communicating the device identifier of the device by the bus driver to an engine that is executable on the computing device;

querying a database by the engine to determine whether one or more flags, that are maintained in the database, have been set for the device identifier;

responsive to a determination that the one or more flags have been set for the device identifier, communicating information that relates to the one or more flags to the bus driver; and applying the information by the bus driver.

17. A method as described in claim 16, wherein the bus driver is configured for USB or PCI.

18. A method as described in claim 16, wherein the information is used for code path selection of the bus driver.

19. A method as described in claim 16, wherein the information is to configure the bus driver for device specific capabilities of the device.

20. A method as described in claim 16, wherein the bus driver is configured to handle capabilities of the device in accordance with a standard and the information is to configure the bus driver for capabilities of the device that do not involve the standard.

* * * * *